(12) United States Patent
Chen et al.

(10) Patent No.: US 8,995,094 B1
(45) Date of Patent: Mar. 31, 2015

(54) DISK DRIVE HEAD SUSPENSION WITH A DUAL DIMPLE AND A FLEXURE TONGUE WITH A PIEZOELECTRIC MICROACTUATOR

(71) Applicant: Western Digital Technologies, Inc., Irvine, CA (US)

(72) Inventors: Yih-Jen Dennis Chen, Pleasanton, CA (US); Tzong-Shii Pan, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/298,709

(22) Filed: Jun. 6, 2014

Related U.S. Application Data

(60) Provisional application No. 61/946,539, filed on Feb. 28, 2014.

(51) Int. Cl.
*G11B 21/21* (2006.01)
*G11B 5/48* (2006.01)

(52) U.S. Cl.
CPC ............ *G11B 5/4873* (2013.01); *G11B 5/4826* (2013.01); *G11B 5/4833* (2013.01)
USPC ...................................................... 360/294.4

(58) Field of Classification Search
USPC ....................................................... 360/294.4
See application file for complete search history.

(56) References Cited

U.S. PATENT DOCUMENTS

| | | |
|---|---|---|
| 5,235,482 A | 8/1993 | Schmitz |
| 5,652,684 A | 7/1997 | Harrison et al. |
| 5,682,669 A | 11/1997 | Harrison et al. |
| 5,852,532 A | 12/1998 | Summers |
| 6,046,889 A | 4/2000 | Berding et al. |
| 6,052,890 A | 4/2000 | Malagrino, Jr. et al. |
| 6,061,206 A | 5/2000 | Foisy et al. |
| 6,101,876 A | 8/2000 | Brooks et al. |
| 6,147,831 A | 11/2000 | Kennedy et al. |
| 6,151,189 A | 11/2000 | Brooks |
| 6,151,197 A | 11/2000 | Larson et al. |
| 6,185,067 B1 | 2/2001 | Chamberlain |
| 6,185,074 B1 | 2/2001 | Wang et al. |
| 6,208,486 B1 | 3/2001 | Gustafson et al. |
| 6,215,616 B1 | 4/2001 | Phan et al. |
| 6,272,694 B1 | 8/2001 | Knoth |
| 6,288,866 B1 | 9/2001 | Butler et al. |
| 6,292,333 B1 | 9/2001 | Blumentritt et al. |
| 6,344,950 B1 | 2/2002 | Watson et al. |
| 6,349,464 B1 | 2/2002 | Codilian et al. |
| 6,388,873 B1 | 5/2002 | Brooks et al. |
| 6,417,979 B1 | 7/2002 | Patton, III et al. |
| 6,421,208 B1 | 7/2002 | Oveyssi |
| 6,441,998 B1 | 8/2002 | Abrahamson |

(Continued)

*Primary Examiner* — Mark Blouin

(57) ABSTRACT

A disk drive head gimbal assembly (HGA) includes a distal region that includes a load beam dimple having a protruding convex surface. The HGA includes a laminated flexure having a structural layer with a tongue disposed between two outrigger beams. A piezoelectric element is adhered to the tongue. The tongue includes an actuated portion to which a read head may be adhered, and that is rotated about an axis of rotation by expansion of the piezoelectric element. The tongue also includes a non-actuated portion that is not rotated by expansion of the piezoelectric element. The non-actuated portion of the tongue adjoins and forms a bridge between the two outrigger beams. The bridge includes a flexure dimple that protrudes from the tongue and has a concave surface that is in contact with the convex surface of the load beam dimple.

22 Claims, 4 Drawing Sheets

(56) References Cited

U.S. PATENT DOCUMENTS

| | | |
|---|---|---|
| 6,462,914 B1 | 10/2002 | Oveyssi et al. |
| 6,466,398 B1 | 10/2002 | Butler et al. |
| 6,469,871 B1 | 10/2002 | Wang |
| 6,502,300 B1 | 1/2003 | Casey et al. |
| 6,519,116 B1 | 2/2003 | Lin et al. |
| 6,529,345 B1 | 3/2003 | Butler et al. |
| 6,529,351 B1 | 3/2003 | Oveyssi et al. |
| 6,535,358 B1 | 3/2003 | Hauert et al. |
| 6,545,382 B1 | 4/2003 | Bennett |
| 6,549,381 B1 | 4/2003 | Watson |
| 6,560,065 B1 | 5/2003 | Yang et al. |
| 6,571,460 B1 | 6/2003 | Casey et al. |
| 6,574,073 B1 | 6/2003 | Hauert et al. |
| 6,580,574 B1 | 6/2003 | Codilian |
| 6,594,111 B1 | 7/2003 | Oveyssi et al. |
| 6,603,620 B1 | 8/2003 | Berding |
| 6,618,222 B1 | 9/2003 | Watkins et al. |
| 6,624,966 B1 | 9/2003 | Ou-Yang et al. |
| 6,624,980 B1 | 9/2003 | Watson et al. |
| 6,624,983 B1 | 9/2003 | Berding |
| 6,628,473 B1 | 9/2003 | Codilian et al. |
| 6,654,200 B1 | 11/2003 | Alexander et al. |
| 6,657,811 B1 | 12/2003 | Codilian |
| 6,661,597 B1 | 12/2003 | Codilian et al. |
| 6,661,603 B1 | 12/2003 | Watkins et al. |
| 6,674,600 B1 | 1/2004 | Codilian et al. |
| 6,690,637 B1 | 2/2004 | Codilian |
| 6,693,767 B1 | 2/2004 | Butler |
| 6,693,773 B1 | 2/2004 | Sassine |
| 6,697,217 B1 | 2/2004 | Codilian |
| 6,698,286 B1 | 3/2004 | Little et al. |
| 6,700,736 B1 | 3/2004 | Wu et al. |
| 6,704,167 B1 | 3/2004 | Scura et al. |
| 6,707,637 B1 | 3/2004 | Codilian et al. |
| 6,707,641 B1 | 3/2004 | Oveyssi et al. |
| 6,710,980 B1 | 3/2004 | Hauert et al. |
| 6,710,981 B1 | 3/2004 | Oveyssi et al. |
| 6,728,062 B1 | 4/2004 | Ou-Yang et al. |
| 6,728,063 B1 | 4/2004 | Gustafson et al. |
| 6,731,470 B1 | 5/2004 | Oveyssi |
| 6,735,033 B1 | 5/2004 | Codilian et al. |
| 6,741,428 B1 | 5/2004 | Oveyssi |
| 6,751,051 B1 | 6/2004 | Garbarino |
| 6,754,042 B1 | 6/2004 | Chiou et al. |
| 6,757,132 B1 | 6/2004 | Watson et al. |
| 6,759,784 B1 | 7/2004 | Gustafson et al. |
| 6,781,780 B1 | 8/2004 | Codilian |
| 6,781,787 B1 | 8/2004 | Codilian et al. |
| 6,781,791 B1 | 8/2004 | Griffin et al. |
| 6,790,066 B1 | 9/2004 | Klein |
| 6,791,791 B1 | 9/2004 | Alfred et al. |
| 6,791,801 B1 | 9/2004 | Oveyssi |
| 6,795,262 B1 | 9/2004 | Codilian et al. |
| 6,798,603 B1 | 9/2004 | Singh et al. |
| 6,801,389 B1 | 10/2004 | Berding et al. |
| 6,801,404 B1 | 10/2004 | Oveyssi |
| 6,816,342 B1 | 11/2004 | Oveyssi |
| 6,816,343 B1 | 11/2004 | Oveyssi |
| 6,825,622 B1 | 11/2004 | Ryan et al. |
| 6,826,009 B1 | 11/2004 | Scura et al. |
| 6,831,810 B1 | 12/2004 | Butler et al. |
| 6,839,199 B1 | 1/2005 | Alexander, Jr. et al. |
| 6,844,996 B1 | 1/2005 | Berding et al. |
| 6,847,504 B1 | 1/2005 | Bennett et al. |
| 6,847,506 B1 | 1/2005 | Lin et al. |
| 6,856,491 B1 | 2/2005 | Oveyssi |
| 6,856,492 B2 | 2/2005 | Oveyssi |
| 6,862,154 B1 | 3/2005 | Subrahmanyam et al. |
| 6,862,156 B1 | 3/2005 | Lin et al. |
| 6,862,176 B1 | 3/2005 | Codilian et al. |
| 6,865,049 B1 | 3/2005 | Codilian et al. |
| 6,865,055 B1 | 3/2005 | Ou-Yang et al. |
| 6,867,946 B1 | 3/2005 | Berding et al. |
| 6,867,950 B1 | 3/2005 | Lin |
| 6,876,514 B1 | 4/2005 | Little |
| 6,879,466 B1 | 4/2005 | Oveyssi et al. |
| 6,888,697 B1 | 5/2005 | Oveyssi |
| 6,888,698 B1 | 5/2005 | Berding et al. |
| 6,891,696 B1 | 5/2005 | Ou-Yang et al. |
| 6,898,052 B1 | 5/2005 | Oveyssi |
| 6,900,961 B1 | 5/2005 | Butler |
| 6,906,880 B1 | 6/2005 | Codilian |
| 6,906,897 B1 | 6/2005 | Oveyssi |
| 6,908,330 B2 | 6/2005 | Garrett et al. |
| 6,922,308 B1 | 7/2005 | Butler |
| 6,930,848 B1 | 8/2005 | Codilian et al. |
| 6,930,857 B1 | 8/2005 | Lin et al. |
| 6,934,126 B1 | 8/2005 | Berding et al. |
| 6,937,444 B1 | 8/2005 | Oveyssi |
| 6,940,698 B2 | 9/2005 | Lin et al. |
| 6,941,642 B1 | 9/2005 | Subrahmanyam et al. |
| 6,947,251 B1 | 9/2005 | Oveyssi et al. |
| 6,950,275 B1 | 9/2005 | Ali et al. |
| 6,950,284 B1 | 9/2005 | Lin |
| 6,950,288 B2 * | 9/2005 | Yao et al. .................. 360/294.4 |
| 6,952,318 B1 | 10/2005 | Ngo |
| 6,954,329 B1 | 10/2005 | Ojeda et al. |
| 6,958,884 B1 | 10/2005 | Ojeda et al. |
| 6,958,890 B1 | 10/2005 | Lin et al. |
| 6,961,212 B1 | 11/2005 | Gustafson et al. |
| 6,961,218 B1 | 11/2005 | Lin et al. |
| 6,963,469 B1 | 11/2005 | Gustafson et al. |
| 6,965,500 B1 | 11/2005 | Hanna et al. |
| 6,967,800 B1 | 11/2005 | Chen et al. |
| 6,967,804 B1 | 11/2005 | Codilian |
| 6,970,329 B1 | 11/2005 | Oveyssi et al. |
| 6,972,924 B1 | 12/2005 | Chen et al. |
| 6,972,926 B1 | 12/2005 | Codilian |
| 6,975,476 B1 | 12/2005 | Berding |
| 6,979,931 B1 | 12/2005 | Gustafson et al. |
| 6,980,391 B1 | 12/2005 | Haro |
| 6,980,401 B1 | 12/2005 | Narayanan et al. |
| 6,982,853 B1 | 1/2006 | Oveyssi et al. |
| 6,989,953 B1 | 1/2006 | Codilian |
| 6,990,727 B1 | 1/2006 | Butler et al. |
| 6,996,893 B1 | 2/2006 | Ostrander et al. |
| 7,000,309 B1 | 2/2006 | Klassen et al. |
| 7,006,324 B1 | 2/2006 | Oveyssi et al. |
| 7,013,731 B1 | 3/2006 | Szeremeta et al. |
| 7,031,104 B1 | 4/2006 | Butt et al. |
| 7,035,053 B1 | 4/2006 | Oveyssi et al. |
| 7,050,270 B1 | 5/2006 | Oveyssi et al. |
| 7,057,852 B1 | 6/2006 | Butler et al. |
| 7,057,857 B1 | 6/2006 | Niu et al. |
| 7,062,837 B1 | 6/2006 | Butler |
| 7,064,921 B1 | 6/2006 | Yang et al. |
| 7,064,922 B1 | 6/2006 | Alfred et al. |
| 7,064,932 B1 | 6/2006 | Lin et al. |
| 7,085,098 B1 | 8/2006 | Yang et al. |
| 7,085,108 B1 | 8/2006 | Oveyssi et al. |
| 7,092,216 B1 | 8/2006 | Chang et al. |
| 7,092,251 B1 | 8/2006 | Henry |
| 7,099,099 B1 | 8/2006 | Codilian et al. |
| 7,113,371 B1 | 9/2006 | Hanna et al. |
| 7,142,397 B1 | 11/2006 | Venk |
| 7,145,753 B1 | 12/2006 | Chang et al. |
| RE39,478 E | 1/2007 | Hatch et al. |
| 7,161,768 B1 | 1/2007 | Oveyssi |
| 7,161,769 B1 | 1/2007 | Chang et al. |
| 7,180,711 B1 | 2/2007 | Chang et al. |
| 7,193,819 B1 | 3/2007 | Chen et al. |
| 7,209,317 B1 | 4/2007 | Berding et al. |
| 7,209,319 B1 | 4/2007 | Watkins et al. |
| D542,289 S | 5/2007 | Diebel |
| 7,212,377 B1 | 5/2007 | Ou-Yang et |
| 7,215,513 B1 | 5/2007 | Chang et al. |
| 7,215,514 B1 | 5/2007 | Yang et al. |
| 7,224,551 B1 | 5/2007 | Ou-Yang et al. |
| D543,981 S | 6/2007 | Diebel |
| 7,227,725 B1 | 6/2007 | Chang et al. |
| 7,239,475 B1 | 7/2007 | Lin et al. |
| 7,256,968 B1 | 8/2007 | Krinke |
| 7,271,978 B1 | 9/2007 | Santini et al. |
| 7,274,534 B1 | 9/2007 | Choy et al. |

(56) References Cited

U.S. PATENT DOCUMENTS

| | | |
|---|---|---|
| 7,280,311 B1 | 10/2007 | Ou-Yang et al. |
| 7,280,317 B1 | 10/2007 | Little et al. |
| 7,280,319 B1 | 10/2007 | McNab |
| 7,292,406 B1 | 11/2007 | Huang |
| 7,298,584 B1 | 11/2007 | Yamada et al. |
| 7,327,537 B1 | 2/2008 | Oveyssi |
| 7,339,268 B1 | 3/2008 | Ho et al. |
| 7,342,746 B1 | 3/2008 | Lin |
| RE40,203 E | 4/2008 | Hatch et al. |
| 7,353,524 B1 | 4/2008 | Lin et al. |
| 7,369,368 B1 | 5/2008 | Mohajerani |
| 7,372,670 B1 | 5/2008 | Oveyssi |
| 7,375,929 B1 | 5/2008 | Chang et al. |
| 7,379,266 B1 | 5/2008 | Ou-Yang et al. |
| 7,381,904 B1 | 6/2008 | Codilian |
| 7,385,784 B1 | 6/2008 | Berding et al. |
| 7,388,731 B1 | 6/2008 | Little et al. |
| 7,420,771 B1 | 9/2008 | Hanke et al. |
| 7,434,987 B1 | 10/2008 | Gustafson et al. |
| 7,436,625 B1 | 10/2008 | Chiou et al. |
| 7,440,234 B1 | 10/2008 | Cheng et al. |
| 7,477,488 B1 | 1/2009 | Zhang et al. |
| 7,477,489 B1 | 1/2009 | Chen et al. |
| 7,484,291 B1 | 2/2009 | Ostrander et al. |
| 7,505,231 B1 | 3/2009 | Golgolab et al. |
| 7,529,064 B1 | 5/2009 | Huang et al. |
| 7,538,981 B1 | 5/2009 | Pan |
| 7,561,374 B1 | 7/2009 | Codilian et al. |
| 7,567,410 B1 | 7/2009 | Zhang et al. |
| 7,576,955 B1 | 8/2009 | Yang et al. |
| 7,593,181 B1 | 9/2009 | Tsay et al. |
| 7,605,999 B1 | 10/2009 | Kung et al. |
| 7,609,486 B1 | 10/2009 | Little |
| 7,610,672 B1 | 11/2009 | Liebman |
| 7,633,721 B1 | 12/2009 | Little et al. |
| 7,633,722 B1 | 12/2009 | Larson et al. |
| 7,656,609 B1 | 2/2010 | Berding et al. |
| 7,660,075 B1 | 2/2010 | Lin et al. |
| 7,672,083 B1 | 3/2010 | Yu et al. |
| 7,684,155 B1 | 3/2010 | Huang et al. |
| 7,684,157 B2 | 3/2010 | Yao et al. |
| 7,686,555 B1 | 3/2010 | Larson et al. |
| 7,709,078 B1 | 5/2010 | Sevier et al. |
| 7,715,149 B1 | 5/2010 | Liebman et al. |
| 7,729,091 B1 | 6/2010 | Huang et al. |
| 7,751,145 B1 | 7/2010 | Lin et al. |
| 7,768,746 B2 | 8/2010 | Yao et al. |
| 7,826,177 B1 | 11/2010 | Zhang et al. |
| 7,852,601 B1 | 12/2010 | Little |
| 7,864,488 B1 | 1/2011 | Pan |
| 7,898,770 B1 | 3/2011 | Zhang et al. |
| 7,903,369 B1 | 3/2011 | Codilian et al. |
| 7,907,369 B1 | 3/2011 | Pan |
| 7,911,742 B1 | 3/2011 | Chang et al. |
| 7,926,167 B1 | 4/2011 | Liebman et al. |
| 7,957,095 B1 | 6/2011 | Tsay et al. |
| 7,957,102 B1 | 6/2011 | Watson et al. |
| 7,961,436 B1 | 6/2011 | Huang et al. |
| 8,004,782 B1 | 8/2011 | Nojaba et al. |
| 8,009,384 B1 | 8/2011 | Little |
| 8,018,687 B1 | 9/2011 | Little et al. |
| 8,031,431 B1 | 10/2011 | Berding et al. |
| 8,064,168 B1 | 11/2011 | Zhang et al. |
| 8,064,170 B1 | 11/2011 | Pan |
| 8,068,314 B1 | 11/2011 | Pan et al. |
| 8,081,401 B1 | 12/2011 | Huang et al. |
| 8,085,508 B2 * | 12/2011 | Hatch ................... 360/294.4 |
| 8,100,017 B1 | 1/2012 | Blick et al. |
| 8,116,038 B1 | 2/2012 | Zhang et al. |
| 8,125,740 B1 | 2/2012 | Yang et al. |
| 8,130,469 B2 | 3/2012 | Yao |
| 8,142,671 B1 | 3/2012 | Pan |
| 8,156,633 B1 | 4/2012 | Foisy |
| 8,159,785 B1 | 4/2012 | Lee et al. |
| 8,169,745 B2 | 5/2012 | Yao et al. |
| 8,189,298 B1 | 5/2012 | Lee et al. |
| 8,194,348 B2 | 6/2012 | Jacoby et al. |
| 8,194,354 B1 | 6/2012 | Zhang et al. |
| 8,194,355 B1 | 6/2012 | Pan et al. |
| 8,203,806 B2 | 6/2012 | Larson et al. |
| 8,223,453 B1 | 7/2012 | Norton et al. |
| 8,228,631 B1 | 7/2012 | Tsay et al. |
| 8,233,239 B1 | 7/2012 | Teo et al. |
| 8,248,733 B1 | 8/2012 | Radavicius et al. |
| 8,259,417 B1 | 9/2012 | Ho et al. |
| 8,274,760 B1 | 9/2012 | Zhang et al. |
| 8,276,256 B1 | 10/2012 | Zhang et al. |
| 8,279,560 B1 | 10/2012 | Pan |
| 8,284,514 B1 | 10/2012 | Garbarino |
| 8,289,646 B1 | 10/2012 | Heo et al. |
| 8,300,352 B1 | 10/2012 | Larson et al. |
| 8,305,708 B2 | 11/2012 | Tacklind |
| 8,320,086 B1 | 11/2012 | Moradnouri et al. |
| 8,322,021 B1 | 12/2012 | Berding et al. |
| 8,345,387 B1 | 1/2013 | Nguyen |
| 8,363,351 B1 | 1/2013 | Little |
| 8,369,044 B2 | 2/2013 | Howie et al. |
| 8,411,389 B1 | 4/2013 | Tian et al. |
| 8,416,522 B1 | 4/2013 | Schott et al. |
| 8,416,534 B1 | 4/2013 | Heo et al. |
| 8,422,171 B1 | 4/2013 | Guerini |
| 8,422,175 B1 | 4/2013 | Oveyssi |
| 8,432,641 B1 | 4/2013 | Nguyen |
| 8,437,101 B1 | 5/2013 | German et al. |
| 8,438,721 B1 | 5/2013 | Sill |
| 8,446,688 B1 | 5/2013 | Quines et al. |
| 8,451,559 B1 | 5/2013 | Berding et al. |
| 8,467,153 B1 | 6/2013 | Pan et al. |
| 8,472,131 B1 | 6/2013 | Ou-Yang et al. |
| 8,477,460 B1 | 7/2013 | Liebman |
| 8,488,270 B2 | 7/2013 | Brause et al. |
| 8,488,280 B1 | 7/2013 | Myers et al. |
| 8,499,652 B1 | 8/2013 | Tran et al. |
| 8,514,514 B1 | 8/2013 | Berding et al. |
| 8,530,032 B1 | 9/2013 | Sevier et al. |
| 8,542,465 B2 | 9/2013 | Liu et al. |
| 8,547,664 B1 | 10/2013 | Foisy et al. |
| 8,553,356 B1 | 10/2013 | Heo et al. |
| 8,553,366 B1 | 10/2013 | Hanke |
| 8,553,367 B1 | 10/2013 | Foisy et al. |
| 8,616,900 B1 | 12/2013 | Lion |
| 8,665,555 B1 | 3/2014 | Young et al. |
| 8,667,667 B1 | 3/2014 | Nguyen et al. |
| 8,693,139 B2 | 4/2014 | Tian et al. |
| 8,693,140 B1 | 4/2014 | Weiher et al. |
| 8,699,179 B1 | 4/2014 | Golgolab et al. |
| 8,702,998 B1 | 4/2014 | Guerini |
| 8,705,201 B2 | 4/2014 | Casey et al. |
| 8,705,209 B2 | 4/2014 | Seymour et al. |
| 8,717,706 B1 | 5/2014 | German et al. |
| 8,743,509 B1 | 6/2014 | Heo et al. |
| 8,755,148 B1 | 6/2014 | Howie et al. |
| 8,756,776 B1 | 6/2014 | Chen et al. |
| 8,760,800 B1 | 6/2014 | Brown et al. |
| 8,760,814 B1 | 6/2014 | Pan et al. |
| 8,760,816 B1 | 6/2014 | Myers et al. |
| 8,773,812 B1 | 7/2014 | Gustafson et al. |
| 8,780,491 B1 | 7/2014 | Perlas et al. |
| 8,780,504 B1 | 7/2014 | Teo et al. |
| 8,792,205 B1 | 7/2014 | Boye-Doe et al. |
| 8,797,677 B2 | 8/2014 | Heo et al. |
| 8,797,689 B1 | 8/2014 | Pan et al. |
| 8,797,691 B1 * | 8/2014 | Tian et al. ................. 360/294.4 |
| 8,824,095 B1 | 9/2014 | Dougherty |
| 8,824,098 B1 | 9/2014 | Huang et al. |
| 2011/0212281 A1 | 9/2011 | Jacoby et al. |
| 2013/0038964 A1 | 2/2013 | Garbarino et al. |
| 2013/0091698 A1 | 4/2013 | Banshak, Jr. et al. |
| 2013/0155546 A1 | 6/2013 | Heo et al. |
| 2013/0265674 A1 | 10/2013 | Fanslau |
| 2013/0290988 A1 | 10/2013 | Watson et al. |

* cited by examiner

DISK DRIVE HEAD SUSPENSION WITH A DUAL DIMPLE AND A FLEXURE TONGUE WITH A PIEZOELECTRIC MICROACTUATOR

CROSS-REFERENCE TO RELATED APPLICATION

This application claims priority to provisional U.S. Patent Application Ser. No. 61/946,539, filed on Feb. 28, 2014, which is incorporated herein in its entirety.

BACKGROUND

Information storage devices are used to retrieve and/or store data in computers and other consumer electronics devices. A magnetic hard disk drive is an example of an information storage device that includes one or more heads that can both read and write, but other information storage devices also include heads—sometimes including heads that cannot write. For convenience, all heads that can read are referred to as "read heads" herein, regardless of other devices and functions the read head may also perform (e.g. writing, flying height control, touch down detection, lapping control, etc).

In a modern magnetic hard disk drive device, each read head is a sub-component of a head gimbal assembly (HGA). The read head typically includes a slider and a read/write transducer. The read/write transducer typically comprises a magneto-resistive read element (e.g. so-called giant magneto-resistive read element, or a tunneling magneto-resistive read element), and an inductive write structure comprising a flat coil deposited by photolithography, and a yoke structure having pole tips that face a disk media.

The HGA typically also includes a suspension assembly that includes a mounting plate, a load beam, and a laminated flexure to carry the electrical signals to and from the read head. The read head is typically bonded to a tongue feature of the laminated flexure. The HGA, in turn, is a sub-component of a head stack assembly (HSA) that typically includes a plurality of HGAs, a rotary actuator, and a flex cable. The mounting plate of each suspension assembly is attached to an arm of the rotary actuator (e.g. by swaging), and each of the laminated flexures includes a flexure tail that is electrically connected to the HSA's flex cable (e.g. by solder reflow bonding or ultrasonic bonding).

Modern laminated flexures typically include electrically conductive copper traces that are isolated from a stainless steel structural layer by a polyimide dielectric layer. So that the signals from/to the head can reach the flex cable on the actuator body, each HGA flexure includes a flexure tail that extends away from the head along the actuator arm and ultimately attaches to the flex cable adjacent the actuator body. That is, the flexure includes electrically conductive traces that are electrically connected to a plurality of electrically conductive bonding pads on the head (e.g. by gold ball bonding), and extend from adjacent the head to terminate at electrical connection points at the flexure tail.

The position of the HSA relative to the spinning disks in a disk drive, and therefore the position of the read heads relative to data tracks on the disks, is actively controlled by the rotary actuator which is typically driven by a voice coil motor (VCM). Specifically, electrical current passed through a coil of the VCM applies a torque to the rotary actuator, so that the read head can seek and follow desired data tracks on the spinning disk.

However, the industry trend towards increasing areal data density has necessitated substantial reduction in the spacing between data tracks on the disk. Also, disk drive performance requirements, especially requirements pertaining to the time required to access desired data, have motivated increases rather than reductions in the rotational speed of the disk. A consequence of these trends is that increased bandwidth is required for servo control of the read head position relative to data tracks on the spinning disk.

One solution that has been proposed in the art to increase disk drive servo bandwidth is dual-stage actuation. Under the dual-stage actuation concept, the rotary actuator that is driven by the VCM is employed as a coarse actuator (for large adjustments in the HSA position relative to the disk), while a so-called "microactuator" having higher bandwidth but lesser stroke is used as a fine actuator (for smaller adjustments in the read head position). Various microactuator designs have been proposed in the art for the purpose of dual-stage actuation in disk drive applications. Some of these designs utilize one or more piezoelectric elements that are affixed to a component of the suspension assembly. For example, the piezoelectric elements may be affixed to the mounting plate or an extension thereof, and/or the load beam or an extension thereof, or to the flexure tongue (a.k.a. the "gimbal tongue") to which the read head is bonded).

Generally, the further the microactuator is disposed from the read head on the suspension assembly, the less bandwidth it can provide. This is due to the dynamics introduced by the intermediate structure of the suspension assembly. On the other hand, the closer the microactuator is disposed to the read head on the suspension assembly, the lesser stroke it can typically provide. Certain design concepts in which a microactuator is disposed on the flexure tongue may be capable of providing a beneficial performance tradeoff.

However, certain tongue-based microactuator concepts may suffer from other application disadvantages. For example, in certain designs, the force (i.e. so-called "gram load") that preloads the read head against the rotating disk surface may deflect the flexure tongue enough to cause undesired rubbing contact between a slider edge and the flexure itself (e.g. a surface of the tongue), thereby interfering with the desired operation of the piezoelectric microactutor. The structural layer (e.g. stainless steel layer) of the laminated flexure cannot practically be made thicker to reduce such deflection, in view of requirements for the flexure pitch and roll compliance. Hence, there is a need in the information storage device arts for an improved suspension assembly design that incorporates a head microactuator on the flexure tongue, and that may be more robust to applied gram loads.

DETAILED DESCRIPTION OF SOME EXAMPLE EMBODIMENTS

Figure 1:
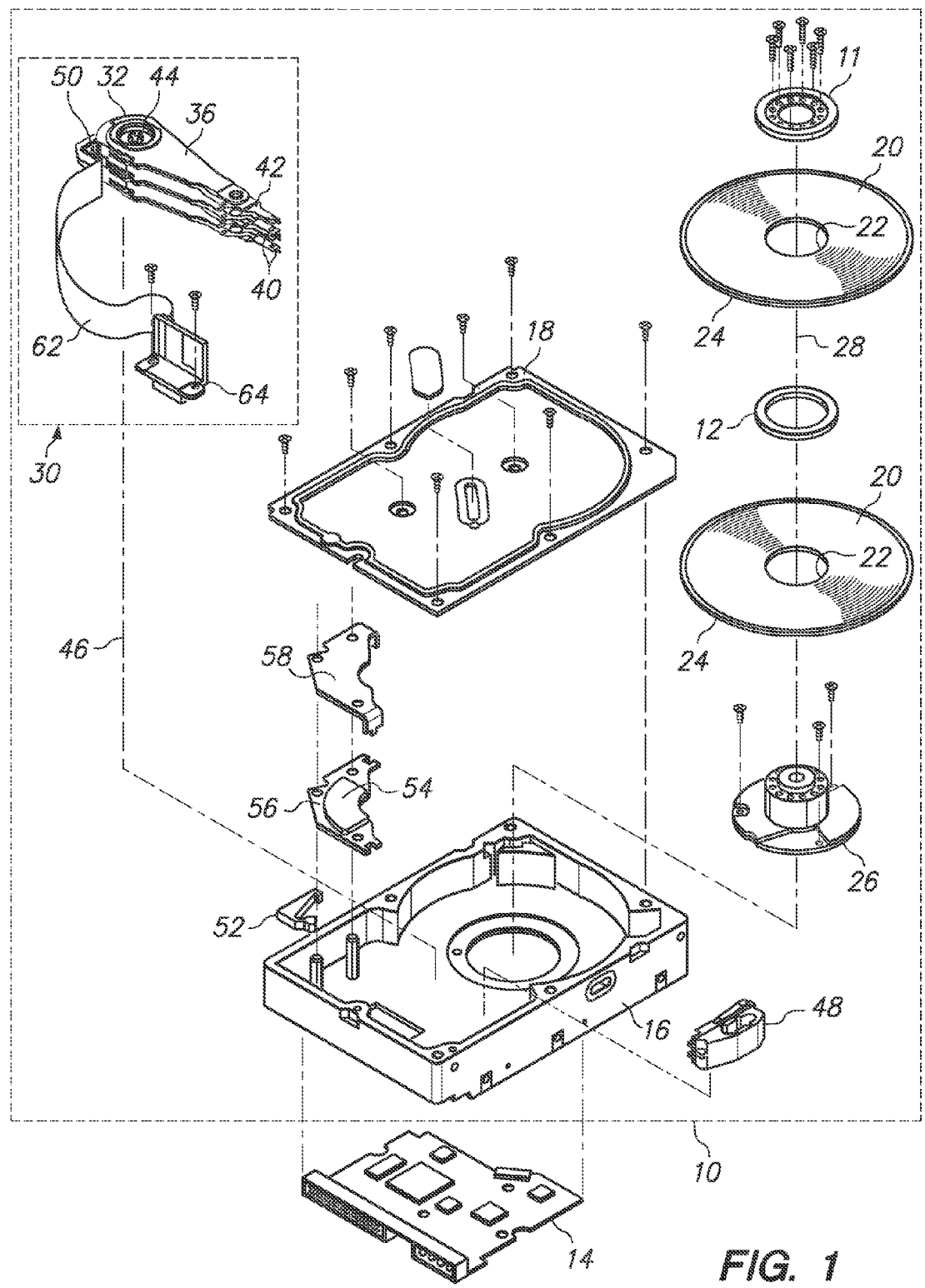
FIG. 1 is an exploded perspective view of a disk drive capable of including an embodiment of the present invention.

FIG. 1 is an exploded perspective view of a disk drive capable of including an embodiment of the present invention. The disk drive of FIG. 1 includes a head disk assembly (HDA) 10 and a printed circuit board (PCB) 14. The HDA 10 includes a disk drive base 16 and a disk drive cover 18, that together enclose other components of the HDA 10. At least one disk 20 is rotably mounted to the disk drive base 16 by a spindle motor 26. The HDA 10 optionally includes one or more additional disks 20, also rotatably mounted to the disk drive base 16 by spindle motor 26, with the disks 20 then separated by one or more spacer rings 12.

The disks 20 may comprise an aluminum, glass, or ceramic substrate, with the substrate optionally being coated with a NiP under-layer, at least one thin-film magnetic layer, a diamond-like amorphous carbon protective layer, and a very thin lubricant layer, for example. The disks 20 are annular in shape, having an outer periphery 24 and an inner periphery 22, and may be clamped to a rotating hub of the spindle motor 26, by a clamp 11. The rotating hub of the spindle motor 26 rotates the disks 20 about a disk axis of rotation 28.

The HDA 10 also includes a head stack assembly (HSA) 30 that includes an actuator 32 that is pivotably mounted to the disk drive base 16 by a pivot bearing 44 that is inserted as a cartridge into a bore in the actuator 32. The pivot bearing 44 allows the actuator 32 to pivot about an actuator pivot axis 46. The actuator 32 may be fabricated from aluminum, magnesium, beryllium, stainless steel, or a non-metallic low mass density material of sufficient stiffness and strength. The pivot bearing 44 may be retained in the bore by a tolerance ring or may be otherwise retained (e.g. by a snap ring, an adhesive, etc). The angular range of motion of the actuator 32 may be limited by a latch and crash stop mechanism 52. The actuator 32 includes at least one actuator arm 36 that extends away from the pivot bearing 44, and an actuator coil 50 that extends away from the pivot bearing 44 in a direction generally opposite the actuator arm 36.

The actuator coil 50 may fit in a yoke structure that optionally comprises a top plate 58 and a bottom plate 56, to form a voice coil motor (VCM). One or both of the top plate 58 and the bottom plate 56 may support a permanent magnet(s) of the VCM (e.g. permanent magnet 54). The top plate 58 and/or the bottom plate 56 preferably comprise a ferromagnetic metal so as to provide a return path for magnetic flux from the permanent magnet(s) through the yoke structure. The ferromagnetic metal yoke structure including the top plate 58 and the bottom plate 56 is preferably affixed to the disk drive base 16, for example by an adhesive, one or more fasteners, and/or magnetic attraction.

A plurality of head gimbal assemblies (HGAs) 42 may be attached to arms 36 of the actuator 32, for example by swaging. A flexible printed circuit (FPC) 62 (also known as a "flex cable") may also be attached to the actuator 32. Each of the HGAs 42 may include a suspension assembly that supports a read head 40 that is bonded to a laminated flexure of the suspension assembly, the laminated flexure having a flexure tail that is electrically connected to the FPC 62. The FPC 62 can communicate electrical signals via a flex bracket 64, between the flexure tails and an external electronic system that is disposed on the PCB 14.

The actuator 32, suspension assemblies 42, and FPC 62 all may be considered as components of the HSA 30. The HDA 10 may also include a conventional head loading ramp 48 that may be positioned adjacent the disks 20 to facilitate merging of the read heads 40 onto surfaces of the disks 20, and to protect the heads 40 during periods of non-operation.

Figure 2:
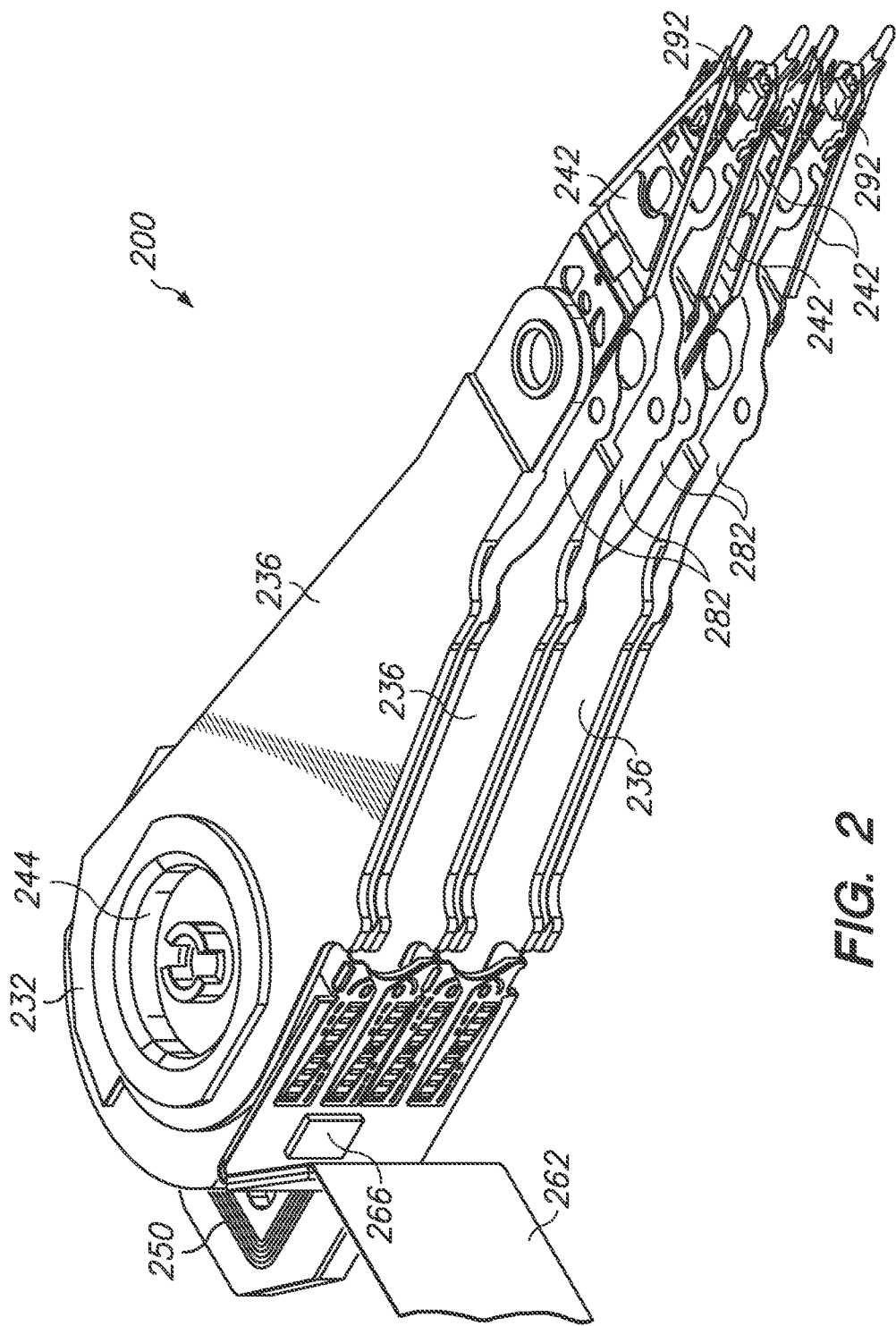
FIG. 2 is a perspective view of a head stack assembly (HSA) capable of including an embodiment of the present invention.

FIG. 2 is a perspective view of a HSA 200, capable of including an embodiment of the present invention. The HSA 200 includes an actuator 232 pivotably attachable to a disk drive base by a pivot bearing 244 that is inserted as a cartridge into a bore in the actuator 232. The actuator 232 may be fabricated from a suitable metal such as aluminum, magnesium, beryllium, stainless steel, or a relatively low mass density non-metallic or composite material having sufficient stiffness. The pivot bearing 244 may be retained in the bore by a tolerance ring or may be otherwise retained (e.g. by a snap ring, an adhesive, etc). The actuator 232 includes a plurality of actuator arms 236 extending away from the pivot bearing 244, and includes an actuator coil 250 that extends away from the pivot bearing 244 in a direction generally opposite the actuator arms 236.

In the embodiment of FIG. 2, a plurality of HGAs 242 are shown to be attached to arms 236 of the actuator 232. Each HGA 242 supports and includes a read head 292. Specifically, each read head 292 is attached and electrically connected to a laminated flexure 282 of the HGA 242. Each HGA 242 is shown to be attached to one of the actuator arms 236, for example by swaging. A FPC 262 is also shown to be attached to the actuator 232. Each laminated flexure 282 includes a plurality of conductive traces. Each laminated flexure 282 has a flexure tail that extends to the FPC 262. The plurality of conductive traces of the laminated flexure 282 is connected to the FPC 262 near a pre-amplifier chip 266 of the FPC 262.

Figure 3:
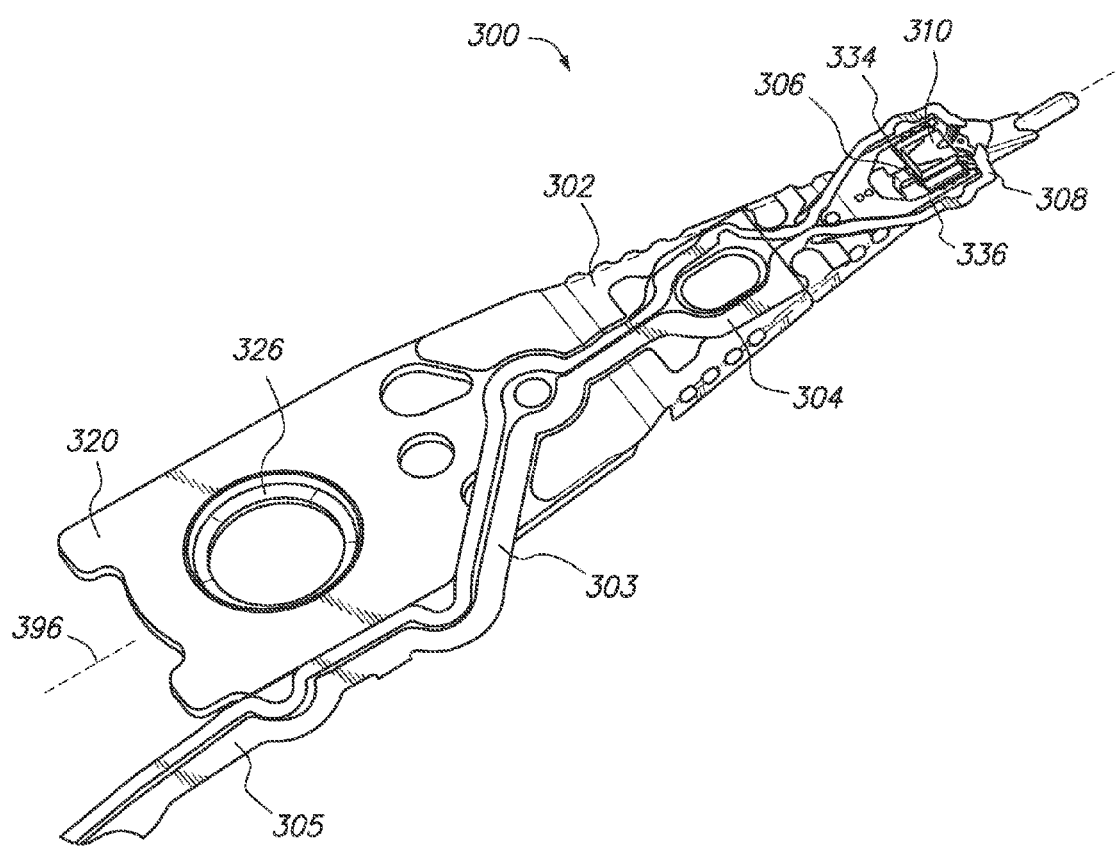
FIG. 3 is a perspective view of a head gimbal assembly (HGA) capable of including an embodiment of the present invention.

FIG. 3 is a perspective view of a HGA 300 capable of including an embodiment of the present invention. The HGA 300 includes a load beam 302 that defines a load beam longitudinal axis 396, and a read head 310 for reading and writing data from and to a magnetic disk. A purpose of the load beam 302 is to provide limited vertical compliance for the read head 310 to follow vertical undulations of the surface of a disk as it rotates, and also to preload an air bearing surface of the read head 310 against the disk surface by a preload force that is commonly referred to as the "gram load." In certain embodiments, the load beam may preferably comprise stainless steel sheet metal having a thickness in the range of 20 to 103 microns.

In the embodiment of FIG. 3, the HGA 300 also includes a laminated flexure 303. In the embodiment of FIG. 3, a distal portion 308 of the laminated flexure 303 includes a tongue 306 to which the read head 310 is adhered. Only a portion of the tongue 306 is visible in the view of FIG. 3 because the read head 310 (and other components of the HGA 300 that will be subsequently described) partially obscures it. The distal portion 308 of the laminated flexure 303 is connected to an attached portion 304 of the laminated flexure 303 by outrigger beams 334, 336. The attached portion 304 of the laminated flexure preferably overlaps and is attached to the load beam 302. The gram load may be applied by the load beam 302 to the read head 310 via contact between a protruding load beam dimple with a back surface of the tongue 306 of the laminated flexure 303. In this context, the back surface of the tongue 306 may be the surface that is opposite that to which the read head 310 is adhered.

A first purpose of the laminated flexure 303 may be to provide compliance for the head 310 to follow pitch and roll angular undulations of the surface of the disk as it rotates, while restricting relative motion between the read head 310 and the load beam 302 in the lateral direction and about a yaw axis. A second purpose of the laminated flexure 303 may be to provide a plurality of electrical paths to facilitate signal transmission to/from the read head 310. For that second purpose, the laminated flexure 303 may include a plurality of electrically conductive traces that are defined in a conventional electrically conductive (e.g., copper) sub-layer of the laminated flexure 303. The electrically conductive traces may be insulated from a support layer (e.g., stainless steel) by a conventional dielectric layer (e.g., polyimide). The electrically conductive traces may extend away from the read head 310 along a flexure tail 305 of the laminated flexure 303, to reach a portion of the flex cable (not shown) that includes a preamplifier chip near the body of the actuator.

In the embodiment of FIG. 3, a proximal region of the load beam 302 (i.e. the region that overlaps the mounting plate 320) is attached to a mounting plate 320, for example by a plurality of spot welds. The load beam 302, the mounting plate 320, and the laminated flexure 303, may together be referred to as a "suspension assembly." Accordingly, the mounting plate 320 may also be referred to as a suspension assembly mounting plate 320. In certain preferred embodiments, the suspension assembly mounting plate 320 includes an annular raised swage boss 326 to facilitate attachment of the suspension assembly to an actuator arm by the well-known conventional attachment process known as swaging. In that case, the suspension assembly mounting plate 320 may also be referred to as a "swage mounting plate." Note that since FIG. 3 is a bottom perspective view, the annular swage boss 326 is raised in a direction away from the viewer.

Figure 4:
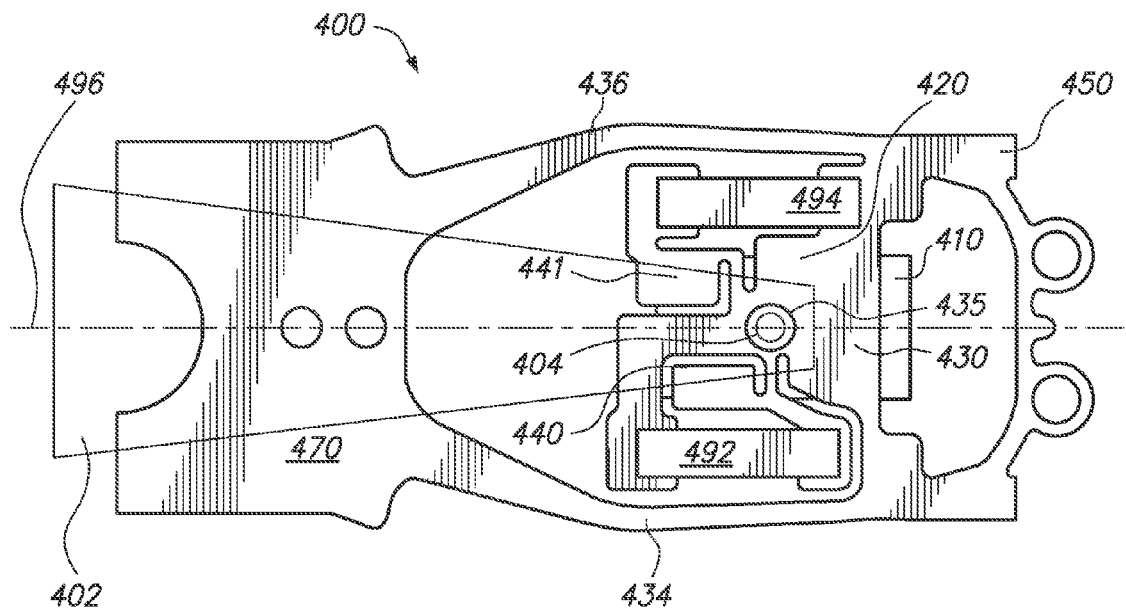
FIG. 4 is a plan view of a distal portion of a HGA according to an embodiment of the present invention, with certain conventional flexure layers removed so that details of the flexure structural layer are not obstructed.

FIG. 4 is a plan view of a distal portion of a HGA 400 according to an embodiment of the present invention. The HGA 400 includes a load beam 402 and a laminated flexure having a structural layer 450. FIG. 4 depicts an example rotary microactuator integrated into a tongue 420 of the structural layer 450 of the laminated flexure of HGA 400. The laminated flexure also includes a conventional dielectric layer (e.g. polyimide) between the structural layer 450 (e.g. stainless steel) and a conventional conductive layer (e.g. copper) that is patterned to include a plurality of conductive traces. However, the conventional conductive and dielectric layers are not shown in FIG. 4, so that details of the flexure structural layer 450 are not obstructed.

In the embodiment of FIG. 4, the tongue 420 of the structural layer 450 is disposed between two outrigger beams 434, 436. A first piezoelectric element 492 and a second piezoelectric actuator 494 are adhered to the tongue 420. A read head 410 is also adhered to the tongue 420. The read head 410 has a trailing end (the end to which the label 410 points in FIG. 4) and a leading end (mostly obscured by the structural layer 450 in FIG. 4). Note that after disk drive assembly, the read head 410 is disposed adjacent a major surface of a spinning disk (e.g. disk 20 of FIG. 1), with the disk surface moving from the leading end towards the trailing end during disk drive operation.

In the embodiment of FIG. 4, the tongue 420 includes actuated portions 440, 441 that are rotated by expansion of the first piezoelectric element 492 and/or the second piezoelectric element 494. The actuated portions are preferably actuated about an axis of rotation that passes through a contact point between a load beam dimple 404 and a flexure dimple 435. The tongue 420 also includes a non-actuated portion 430 that is not rotated by expansion of the first or second piezoelectric elements 492, 494. The non-actuated portion 430 of the tongue 420 adjoins and forms a bridge between the two outrigger beams 434, 436. The bridge 430 includes the flexure dimple 435 that is in contact with a load beam dimple 404.

In the embodiment of FIG. 4, the actuated portions 440, 441 of the tongue 420 include head mounting plates that are adhered to the read head 410 closer to its leading end than to its trailing end. Each of the first and second piezoelectric elements 492, 494 has an anchored end that is adhered to the bridge 430. Each of the first and second piezoelectric elements 492, 494 has an opposing actuated end that is adhered to the actuated portions 440, 441 of the tongue 420. Note that in the present context, each of the first and second piezoelectric elements 492, 494 may optionally be a multilayer piezoelectric element comprising a plurality of piezoelectric material layers sandwiched between conductive electrode layers.

Note that in the embodiment of FIG. 4, each of the first and second piezoelectric elements 492, 494 is elongated in the longitudinal direction (i.e. parallel to longitudinal axis 496), and the read head 410 is disposed between the first and second piezoelectric elements 492, 494. In this context, "between" is qualified by a viewing direction normal to the air bearing surface of the read head 410. In certain embodiments, this may provide a design freedom advantage, in that it may then be possible to optionally mount the piezoelectric elements on the same side of the structural layer 450 as is the read head 410.

In the embodiment of FIG. 4, the head mounting plates of the actuated portions 440, 441 are connected to the non-actuated portion 430 of the tongue 420 by elongated members that are preferably compliant enough to facilitate rotary motion of the head 410 about the contact location of the dimples 404, 435. In the embodiment of FIG. 4, the two outrigger beams 434, 436 connect the non-actuated portion 430 of the tongue 420 to a proximal region 470 of the laminated flexure. In turn, the proximal region 470 of the laminated flexure overlaps and is attached to a proximal region of the load beam 402 that is attached to the actuator arm (e.g. via a swage mounting plate).

Figure 5A:
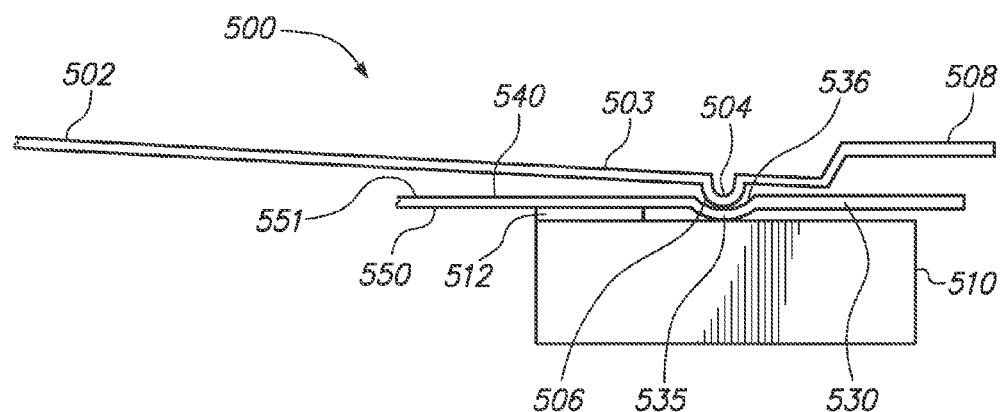
FIG. 5A is a side cross sectional view along a longitudinal centerline of a distal portion of a HGA according to an embodiment of the present invention, with certain conven
Figure 5B:
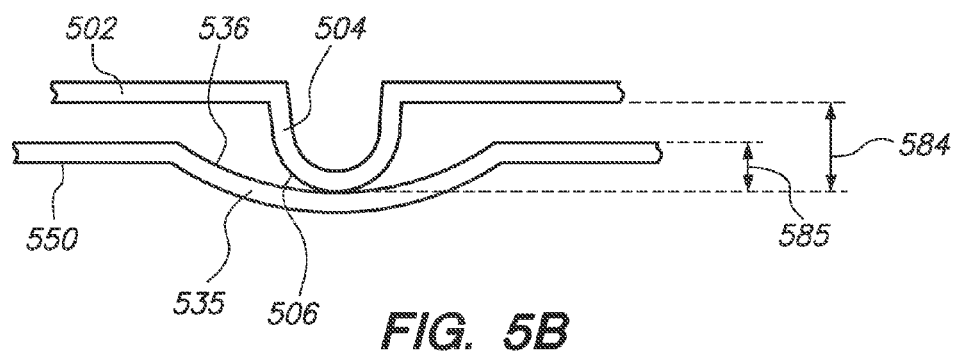
- FIG. 5B is an expanded view of a portion of FIG. 5A.

FIG. 5A is a side cross sectional view along a longitudinal centerline of a distal portion of a HGA 500 according to an embodiment of the present invention, with conventional conductive and dielectric flexure layers removed so that details of the dimple contact location are not obstructed. FIG. 5B is an expanded view of a portion of FIG. 5A. Now referring to the embodiment of FIGS. 5A and 5B, the load beam 502 has a distal region 503 that has a lift tab 508 and a load beam dimple 504.

In the embodiment of FIGS. 5A and 5B, the load beam dimple 504 has a convex surface 506 that protrudes and contacts the back surface 551 of the structural layer 550 (e.g. stainless steel layer) of the laminated flexure. In certain embodiments, the distal region 503 of the load beam 502 is substantially flat, and the convex surface 506 of the load beam dimple 504 protrudes from the substantially flat distal region 503 by a load beam dimple height 584 in the range of 50 microns to 85 microns.

In the embodiment of FIGS. 5A and 5B, the structural layer 550 (e.g. stainless steel layer) has a flexure dimple 535 that is concentric with and has a larger radius of curvature than the load beam dimple 504. In certain embodiments, the load beam dimple 504 preferably has a lesser diameter and a greater dimple height 584 than the flexure dimple 535. In certain embodiments, the flexure dimple 535 optionally has a larger diameter than the load beam dimple 504. In the embodiment of FIGS. 5A and 5B, a concave surface 536 of the flexure dimple 535 is in contact with the convex surface 506 of the downward protruding load beam dimple 504.

In certain embodiments the depth 585 of the flexure dimple 535, measured relative to an adjacent surface of the structural layer 550 in the tongue, may be approximately equal to the thickness of the adhesive slider bonding 512. For example, the depth 585 of the flexure dimple 535 may be in the range of 10 to 35 microns (which may also be approximately equal to the thickness of the dielectric layer of the laminated flexure, or the thickness of the dielectric layer together with the conductive layer of the laminated flexure, in certain embodiments). In such embodiments, the depth 585 of the flexure dimple 535 is preferably less than the height 584 of the load beam dimple 504.

In the embodiment of FIGS. 5A and 5B, the flexure dimple protrudes downward from the non-actuated portion 530 (e.g. bridge portion) of the structural layer 550 in the tongue of the flexure. In certain embodiments, such downward protrusion of the flexure dimple 535 provides a standoff support (for the head 510) extending from the non-actuated portion 530 of the structural layer 550 of the flexure. Such standoff support may, in certain embodiments, prevent a rubbing contact between the head 510 and the structural layer 550 of the flexure itself during microactuation and under an applied gram load. As shown in FIGS. 5A and 5B, the flexure dimple 535 forms such an additional standoff support (e.g. to carry the gram load), along with one or more adhesive bonds 512 to the head mounting plates of the actuated portions 540 of the structural layer 550.

The invention has been described herein with reference to specific exemplary embodiments, but those skilled in the art will recognize that the invention is not limited to those. It is contemplated that various features and aspects of the invention may be used individually or jointly and possibly in a different environment or application. Accordingly, the specification and drawings are to be regarded as illustrative and exemplary rather than restrictive. For example, the word "preferably," and the phrase "preferably but not necessarily," are used synonymously herein to consistently include the meaning of "not necessarily" or optionally. Furthermore, "comprising," "including," and "having," are intended to be open-ended terms.

What is claimed is:

1. A disk drive comprising:
    a disk drive base;
    a spindle attached to the disk drive base;
    a disk mounted on the spindle;
    a first actuator pivotally attached to the disk drive base, the first actuator including a conductive coil and an actuator arm;
    a head suspension assembly comprising
        a load beam having a proximal region that is attached to the actuator arm and a distal region that includes a load beam dimple having a convex surface that protrudes from the load beam;
        a laminated flexure comprising a dielectric layer between a structural layer and a conductive layer, the conductive layer being patterned to include a plurality of conductive traces, the structural layer including a tongue disposed between two outrigger beams; and
        a piezoelectric element adhered to the tongue;
    wherein the tongue includes an actuated portion that is rotated about an axis of rotation by expansion of the piezoelectric element, and the tongue includes a non-actuated portion that is not rotated by expansion of the piezoelectric element;
    wherein the non-actuated portion of the tongue adjoins and forms a bridge between the two outrigger beams, and the bridge includes a flexure dimple that protrudes from the tongue and has a concave surface that is in contact with the convex surface of the load beam dimple; and
    a read head adhered to the actuated portion of the tongue.

2. The disk drive of claim 1 wherein the flexure dimple defines a radius of curvature that is greater than that of the load beam dimple.

3. The disk drive of claim 1 wherein the read head is disposed adjacent a surface of the disk, the read head having a leading end and a trailing end, the disk surface moving from the leading end towards the trailing end during disk drive operation.

4. The disk drive of claim 3 wherein the actuated portion of the tongue includes at least one head mounting plate that is disposed closer to the leading end than to the trailing end, and the read head is adhered to the at least one head mounting plate.

5. The disk drive of claim 1 wherein the head suspension assembly further includes a swage plate having an annular raised swage boss, the proximal region of the load beam being attached to the actuator arm by the swage plate.

6. The disk drive of claim 1 wherein the concave surface of the flexure dimple defines a flexure dimple depth, measured relative to an adjacent surface of the tongue, that is in the range of 10 to 35 microns.

7. The disk drive of claim 1 wherein the at least one head mounting plate is connected to the non-actuated portion of the tongue by an elongated compliant member.

8. The disk drive of claim 1 wherein the load beam comprises stainless steel, the structural layer of the laminated flexure comprises stainless steel, the dielectric layer of the laminated flexure comprises polyimide, and the conductive layer of the laminated flexure comprises copper.

9. The disk drive of claim 1 wherein the distal region of the load beam is substantially flat, and the convex surface of the load beam dimple protrudes from the substantially flat distal region by a load beam dimple height in the range of 50 microns to 85 microns.

10. The disk drive of claim 1 wherein the two outrigger beams connect the non-actuated portion of the tongue to an attached region of the laminated flexure, the attached region of the laminated flexure overlapping and being attached to the load beam.

11. The disk drive of claim 1 wherein the load beam dimple contacts the flexure dimple at a dimple contact location, and the axis of rotation passes through the dimple contact location.

12. The disk drive of claim 1 wherein the piezoelectric element has an anchored end that is adhered to the bridge, and an opposing actuated end that is adhered to the actuated portion of the tongue.

13. A head gimbal assembly (HGA) for a disk drive, the HGA comprising:
    a swage plate having an annular raised swage boss;
    a load beam having a proximal region that is attached to the swage plate and a distal region that includes a load beam dimple having a convex surface that protrudes from the load beam;
    a laminated flexure comprising a dielectric layer between a structural layer and a conductive layer, the conductive layer being patterned to include a plurality of conductive traces, the structural layer including a tongue disposed between two outrigger beams; and
    a piezoelectric element adhered to the tongue;
    wherein the tongue includes an actuated portion that is rotated about an axis of rotation by expansion of the piezoelectric element, and the tongue includes a non-actuated portion that is not rotated by expansion of the piezoelectric element;
    wherein the non-actuated portion of the tongue adjoins and forms a bridge between the two outrigger beams, and the bridge includes a flexure dimple that protrudes from the tongue and has a concave surface that is in contact with the convex surface of the load beam dimple; and a read head adhered to the actuated portion of the tongue.

14. The HGA of claim 13 wherein the flexure dimple defines a radius of curvature that is greater than that of the load beam dimple.

15. The HGA of claim 13 wherein the read head has a leading end and a trailing end, and the actuated portion of the tongue includes at least one head mounting plate that is disposed closer to the leading end than to the trailing end, with the read head being adhered to the at least one head mounting plate.

16. The HGA of claim 13 wherein the concave surface of the flexure dimple defines a flexure dimple depth, measured relative to an adjacent surface of the tongue, that is in the range of 10 to 35 microns.

17. The HGA of claim 13 wherein the at least one head mounting plate is connected to the non-actuated portion of the tongue by an elongated compliant member.

18. The HGA of claim 13 wherein the load beam comprises stainless steel, the structural layer of the laminated flexure comprises stainless steel, the dielectric layer of the laminated flexure comprises polyimide, and the conductive layer of the laminated flexure comprises copper.

19. The HGA of claim 13 wherein the distal region of the load beam is substantially flat, and the convex surface of the load beam dimple protrudes from the substantially flat distal region by a load beam dimple height in the range of 50 microns to 85 microns.

20. The HGA of claim 13 wherein the two outrigger beams connect the non-actuated portion of the tongue to a proximal region of the laminated flexure, the proximal region of the laminated flexure overlapping and being attached to the proximal region of the load beam.

21. The HGA of claim 13 wherein the load beam dimple contacts the flexure dimple at a dimple contact location, and the axis of rotation passes through the dimple contact location.

22. The HGA of claim 13 wherein the piezoelectric element has an anchored end that is adhered to the bridge, and an opposing actuated end that is adhered to the actuated portion of the tongue.

* * * * *